United States Patent
Bunde et al.

(10) Patent No.: US 8,752,666 B2
(45) Date of Patent: Jun. 17, 2014

(54) FITTING SYSTEM FOR A HYDRAULIC TUNING TUBE

(75) Inventors: Christopher Michael Bunde, Whitehouse, OH (US); Jason W. Dahms, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 234 days.

(21) Appl. No.: 13/178,849

(22) Filed: Jul. 8, 2011

(65) Prior Publication Data

US 2012/0007353 A1 Jan. 12, 2012

Related U.S. Application Data

(60) Provisional application No. 61/363,424, filed on Jul. 12, 2010.

(51) Int. Cl.
*F16L 55/02* (2006.01)

(52) U.S. Cl.
USPC .............................................. 181/233; 285/49

(58) Field of Classification Search
USPC .................. 181/233; 138/26, 30; 285/49
See application file for complete search history.

(56) References Cited

U.S. PATENT DOCUMENTS

| | | | |
|---|---|---|---|
| 3,063,470 A | 11/1962 | Forster | |
| 3,323,305 A | 6/1967 | Klees | |
| 3,380,480 A | 4/1968 | Bleasdale | |
| 4,809,751 A * | 3/1989 | McKenzie | 138/89 |
| 5,201,343 A * | 4/1993 | Zimmermann et al. | 138/26 |
| 5,539,164 A | 7/1996 | van Ruiten | |
| 5,791,141 A | 8/1998 | Phillips | |
| 6,131,613 A | 10/2000 | Jenski, Jr. et al. | |
| 6,494,496 B1 * | 12/2002 | Sweeney | 285/115 |
| 6,688,423 B1 | 2/2004 | Beatty et al. | |
| 6,917,907 B2 | 7/2005 | Hsi et al. | |
| 7,000,728 B2 * | 2/2006 | Drouet | 181/233 |
| 7,017,610 B2 * | 3/2006 | Zimpfer et al. | 138/30 |
| 7,325,570 B1 | 2/2008 | Krieger | |
| 2010/0007134 A1 * | 1/2010 | Elton et al. | 285/31 |

FOREIGN PATENT DOCUMENTS

| | | |
|---|---|---|
| EP | 1486717 A1 | 12/2004 |
| WO | WO-03095886 A1 | 11/2003 |

OTHER PUBLICATIONS

International Search Report, PCT/IB2011/001625, Filed Dec. 28, 2011.

* cited by examiner

*Primary Examiner* — Jeremy Luks
(74) *Attorney, Agent, or Firm* — Rader, Fishman & Grauer PLLC (57) ABSTRACT

A connector having a tuning tube attached to a secondary fitting where said secondary fitting is secured to said connector using a press fit or a mating thread structure and where said tuning tube is pinched between two different bore radius sections within the connector and a sleeve section of the secondary fitting. In an alternate embodiment, the tuning tube is held by one or more barbs or sharp edged annular rings formed on the inside bore of the connector. The tuning tube can be made of one or more sections of tubing joined together.

16 Claims, 5 Drawing Sheets

FITTING SYSTEM FOR A HYDRAULIC TUNING TUBE

CROSS-REFERENCE TO RELATED CASES

This application claims the benefit of provisional application Ser. No. 61/363,424 filed on Jul. 12, 2010. This application is related to application Ser. No. 13/178,794, filed on the same day as this Application and to application Ser. No. 13/178,832 also filed on the same day as this Application.

TECHNICAL FIELD

The present invention relates to suppression of fluid system noise using a tuning tube within a fluid conveyance hose and more particularly to the structure and method of attaching the tuning tube to a connector fitting for holding the tuning tube within the hose in a hydraulic system which allows for ease of replacement of the tuning tube.

BACKGROUND

Fluid borne noise generated within a pressurized hydraulic system which uses a pump such as an automotive power steering system, can cause undesired noise and vibration. The oscillating pressure ripples generated by the hydraulic pump are carried within the hydraulic hose and tubing and cause other components to vibrate and emit noise. The use of a tuning tube or cable mounted within a fluid conveyance hose to attenuate these pressure oscillations is known in the art with a description of such of system in U.S. Pat. No. 3,323,305 entitled Attenuation Device and issued to G. Klees on Jun. 6, 1967. The fluid noise reduction structure of the prior art comprises a flexible plastic tube, called a tuning tube, that is attached to a hydraulic connector and then placed inside a section of hydraulic hose. The hose is usually permanently attached to the connector by crimping a socket formed on the fitting. The tuning tube can have holes formed along its length to increase the level of attenuation of the pressure pulses and hence, the level of generated noise. The material used for the tuning tube (or tuning cable) can be plastic such as PTFE (Teflon) or flexible metal such as a corrugated tube, or a wound or woven tube out of a material such as fiberglass and other similar materials such as rubber or synthetic rubber.

The tuning tube can be made of some type of plastic material such as nylon or PTFE (Teflon) or a spirally wound metal wall tube with a discontinuous wall construction that results in a distributed leakage along the length of the tuning tube can be used. It is known to use a connector that is both connected to the hydraulic hose and is connected to the tuning tube. If the tuning tube is made of a plastic tube material, the tube is commonly slipped over a relatively short barbed end of a hose nipple extending from the connector. The hose is attached to the fitting using a crimped socket that is mounted on the connector and overlies the nipple.

The length or other geometry of the tuning tube must be specifically selected to provide the highest level of attenuation depending on the frequencies generated by the pump and the natural vibration frequencies of the various components. Sometimes this can be empirically determined but even then, trial and error is most often used to determine the correct length of the tuning tube along with the location and size of any holes or other apertures along its length. Using the prior art system, the hose assembly is discarded every time the tuning tube is changed out which is time consuming and expensive. Thus, it would be desirable to have a development system that would permit the tuning tube to be easily changed without building a whole new hose assembly.

SUMMARY

The exemplary tuning tube is a plastic tube that is attached to a secondary fitting which is inserted into the hydraulic connector and can be easily removed from the connector and then re-assembled to the connector without disturbing the hydraulic hose that is permanently attached to the connector. The plastic tube can retained by the secondary fitting using a variety of techniques such as an interference fit, barbs formed on the secondary fitting or using a relatively sharp ridge(s) formed on the secondary fitting.

Using the tuning tube (sometimes called a tuning cable) and fittings of the exemplary tuning tube assembly, the tuning tube can be easily modified in an effort to tune the tube to maximize the noise attenuation in each installation. After the secondary fitting with the attached tuning tube is removed from the connector, the secondary fitting with a modified tuning tube can be inserted into the connector fitting and the cable assembly re-installed into the hydraulic system. In the alternative, the tube can be removed from the secondary fitting and a tube having a different geometry or design inserted onto the secondary fitting and secured. The original secondary fitting with the new tuning tube can be inserted and secured to the connector (primary fitting).

If the installation still exhibits excessive noise and needs further tuning, using the tuning tube and fittings of the exemplary tuning tube assembly, the tuning tube can again be easily modified in an effort to tune the tube to maximize the noise attenuation in each installation without making a new hose assembly. After the connector is disconnected at one end from the hydraulic system the secondary fitting with the attached tuning tube is removed from the connector. A new secondary fitting with a modified tuning tube installed can then be inserted into the connector and the hose assembly re-installed into the hydraulic system. In the alternative, the tube can be removed from the secondary fitting and a tube having a different geometry or design installed onto the secondary fitting and this modified tuning tube assembly can be then be re-installed into the connector.

In one embodiment of the exemplary connector assembly, a tuning tube is pressed onto a sleeve section of a secondary fitting to form a tuning tube assembly. Then the tuning tube assembly is inserted into the central cavity of a hydraulic connector that is attached to a hydraulic hose so that the tuning tube lies within the hose. The secondary fitting includes a collar section that is pressed into a receiving cavity formed in the connector. The tuning tube is pinched between the sleeve section and the central cavity of the connector to retain the tube in place.

In a first alternative embodiment of the exemplary connector assembly, a secondary fitting is designed to be a press fit into the central cavity of the hydraulic connector that is eventually connected to a hydraulic hose. A tapered collet sides over the tube and has a fustoconical section that engages a fustoconical section formed in the inner wall of the connector is sized to compress the tapered collet as it is forced into the connector and held in position by the pressed-in secondary fitting.

In a second alternate embodiment of the exemplary connector assembly, a threaded sleeve is used to trap the tube in a reduced diameter section formed in the connector. During assembly, the tuning tube is pressed onto a secondary fitting that includes a threaded collar. This tuning tube assembly is inserted into a central cavity formed in the connector that includes mating threads that engage the threads on the collar. As the threaded collar is turned, the tube is trapped in between a sleeve section of the secondary fitting and a junction at the inner wall of the connector.

To better retain the tube in the secondary fitting, barbs or a sharp annular ring(s) or a nipple section can be formed in the outer surface of the sleeve section of the secondary fitting. In general, these barbs or sharp edged annular ring(s) can be located in various positions on the outer surface of the sleeve section and extend to grip the inner surface of the tuning tube. Or, in the alternative, or in addition to the barbs or sharp edged annular ring(s), the inner wall of the primary fitting can be reduced in its inner diameter to form a ridge or junction and this ridge presses against the tube to "pinch" the tube between the connector and secondary fittings thus holding it in position inside the connector.

If there is a need to adjust the length of the tuning tube, an alternate embodiment of the tube would allow for the addition or removal of sections of tuning tube where a lip or annular ring is formed in the wall at the end of a first tube and that lip fits into an annular groove formed in the wall of a second tube. That second tube can be attached to a third tube in a similar manner and additional tubes can be also attached one to the other sequentially. Likewise, if there is a need to shorten the tuning tube, then sections of tube can be easily pulled away from one another.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 1:
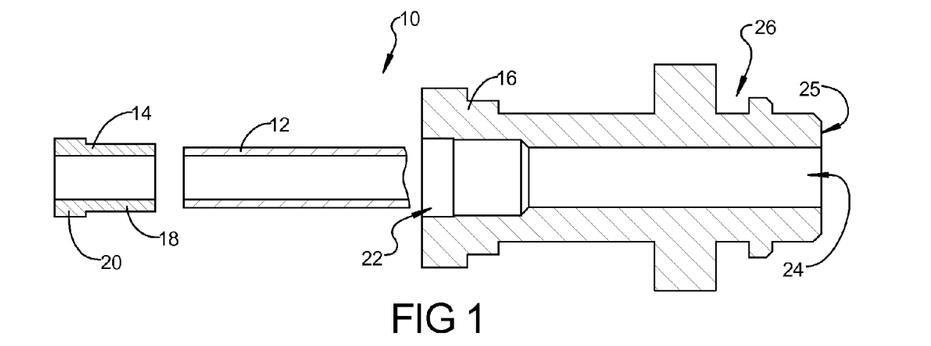
FIG. 1 is an exploded cross-sectional view of the exemplary tuning tube, secondary fitting and connector.

Now referring to FIG. 1 of the drawings, an exploded cross-sectional view of the exemplary tuning tube retention assembly 10 which includes a tuning tube 12, secondary fitting 14 and connector 16 is shown. The tuning tube 12 can be made out of a suitable plastic material or more advanced material such as PTFE (Teflon) or other similar material that is durable yet flexible. In FIG. 1, the tuning tube 12 is shown as a solid wall tube but it is known to add one or more apertures such as slots or holes along the length of the tuning tube 12 to increase the level of noise reduction due to the presence of the tuning tube 12.

The secondary fitting 14 is made of a sleeve section 18 that is attached to a collar section 20. The tuning tube 12 is pressed onto the sleeve section 18 which forms the tuning tube retention assembly 10 shown in FIG. 4. The connector 16 has a receiving cavity 22 that is sized for a press fit between the receiving cavity 22 and the collar section 20 of the secondary fitting 14. The inner bore 24 is sized to provide a slip fit between the inner bore 24 and the tuning tube 12.

The connector 16 can be designed to provide a barbed nipple section (not shown) for attachment of a hydraulic hose that is formed with its outlet end 25. The nipple can have a variety of known configurations to retain different types of hydraulic hose constructions. In this case, a hose socket can be attached to the groove 26 formed in the connector 16. A hydraulic hose (not shown) is then forced onto the barbed nipple and held in place using a crimp force on the socket.

Figure 2:
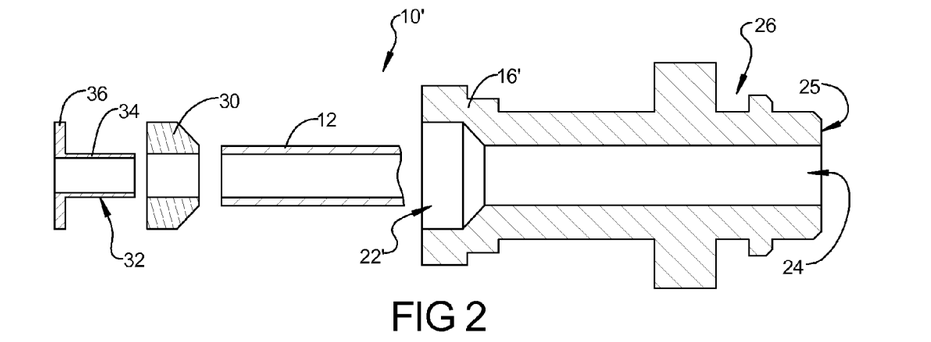
FIG. 2 is an exploded cross-sectional view of a first alternate embodiment of the exemplary tuning tube, secondary fitting and connector.

Now referring to FIG. 2 of the drawings, an exploded cross-sectional view of a first alternate tuning cable retention assembly 10' is shown along with an alternate connector 16'. The tuning tube 12 is shown as a solid walled plastic tube but could have one or more apertures formed along its length. An alternate secondary fitting 32 has a sleeve section 34 that is sized to be lightly pressed into the tuning tube 12. A collar section 36 is attached to the sleeve section 34 and is sized to be pressed into a receiving cavity 22' formed in the inlet of the alternate connector 16'. A collet 30 is designed to provide a clamping force on the tuning tube 12 as the secondary fitting 32 is pressed into the connector 16'. This serves to increase the holding force applied to the tuning tube 12 after the tuning tube assembly 10' is assembled into the connector 16'.

The receiving cavity 22' of the connector 16' is relatively smooth and has a diameter that provides for a press fit between the collar section 36 of the secondary fitting 32 and the receiving cavity 22'. The outlet end 25 of the connector 16' can be formed with a hose nipple (not shown) of various designs. To further retain the hydraulic hose on the nipple, a socket (not shown) can be mounted to the secondary fitting 16' at the groove 26. The socket is crimped against the outside of the hose.

Figure 3:
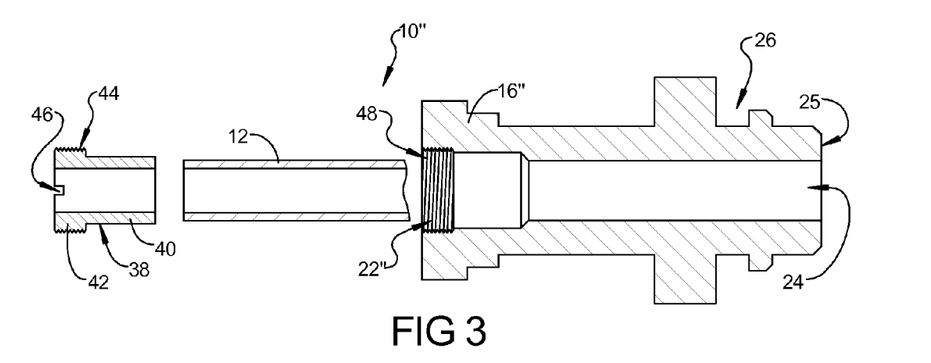
FIG. 3 is an exploded cross-sectional view of a second alternate embodiment of the exemplary tuning tube, secondary fitting and connector.

Now referring to FIG. 3 of the drawings, an exploded cross-sectional view of a second alternate embodiment of the tuning cable retention assembly 10" is shown along with a mating alternate connector 16". A threaded secondary fitting 38 is shown having a sleeve section 40 and a collar section 42.

The collar section 42 has threads 44 formed in the outside surface. A slot 46 at the end of the collar section 42 provides access for a tool to be used to turn the secondary fitting 38 and tighten the threads 44 with the mating threads 48 formed in the receiving cavity 22" of the alternate connector 16". The secondary fitting 38 can be turned using a tool that engages the slot 46 to secure the tuning cable retention assembly 10" to the connector 16". Thus, the tuning tube assembly 10" can easily be changed out by simply disconnecting the connector 16" from the hydraulic system at the inlet 22". Then the secondary fitting 38 can be rotated using a tool that engages the slot 46 until the tuning tube retention assembly 10" can be withdrawn from the connector 16". The tuning tube 12 can then be removed and replaced with a tuning tube 12 with a different configuration or a completely separate tuning tube assembly 10" can be inserted into the connector 16" and tightened in place. Then the connector 16" is re-attached to the hydraulic system.

Figure 4:
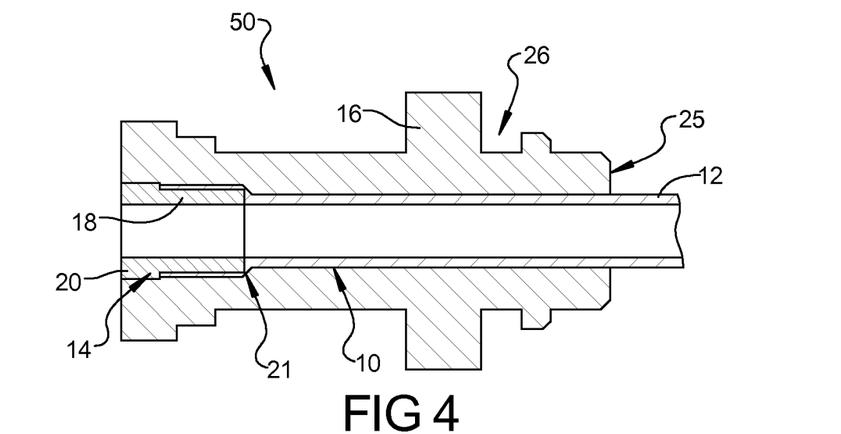
FIG. 4 is a cross-sectional view of a connector assembly made up of the components shown in FIG. 1.

Now referring to FIG. 4 of the drawings, cross-sectional view of connector assembly 50 is shown. The secondary fitting 14 has been lightly pressed into the connector 16 at collar section 20 after the tuning tube 12 was pushed onto the sleeve section 18 or the secondary fitting 14 can be a slip fit into the connector 16 and the cable retention assembly 10 will be trapped where the connector 16 is attached to the hydraulic system. As the tuning tube retention assembly 10 is inserted into the connector 16, the tuning tube 12 is pinched at junction 21 which functions to further secure the tuning tube 12 in position. The thickness of the tuning tube 12 at the sleeve section 18 depends on the material used for the tuning tube 12 and on the outside diameter of the sleeve section 18. A hose nipple (not shown) can be formed at the end of the connector 16 to retain a connected hydraulic hose where the tuning tube is inserted into the hose and functions to reduce hydraulic system noise.

Figure 5:
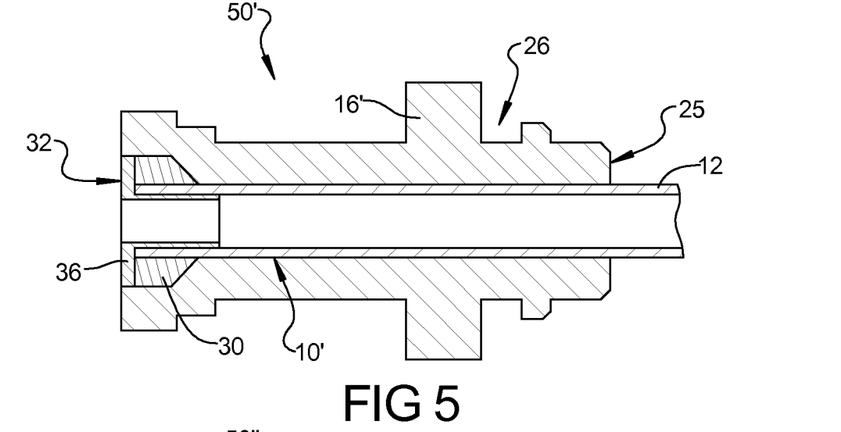
FIG. 5 is a cross-sectional view of a connector assembly made up of the components shown in FIG. 2.

Now referring to FIG. 5 of the drawings, a cross-sectional view of a first alternate embodiment of the connector assembly 50' is shown. The tuning tube retention assembly 10' which consists of the secondary sleeve 32 with the attached tuning tube 12 has been pressed into the inlet end of the connector 16' and the connector 16' is ready to be connected to the hydraulic system. If a hydraulic hose is to be used, then a barbed nipple can be attached to the outlet end 25 of the connector 16' and a hose socket (not shown) can be mounted to the connector 16' at the mounting slot 26. The hose is pushed onto the nipple and the socket is crimped onto the hose to pinch the hose between the socket and the nipple (with or without barbs).

The collet 30 is pressing against the tuning tube 12 to hold the tuning cable assembly 10' in place within the connector 16'. There is a light press on the secondary fitting 32 so that it can be easily removed from the connector if the tuning tube assembly 10' needs to be removed for replacement with a tube 12 having a different design.

Figure 6:
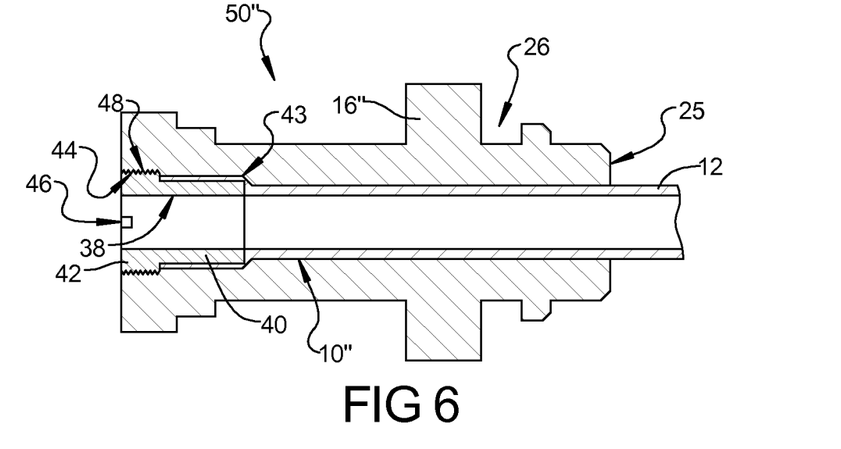
FIG. 6 is a cross-sectional view of a connector assembly made up of the components shown in FIG. 3.

Now referring to FIG. 6 of the drawings, a cross-sectional view of a second alternate embodiment of the exemplary connector assembly 50" is shown. The threaded secondary fitting 38 is shown threaded into the inlet end of the connector 16" thereby securing the tuning cable retention assembly 10" to the connector 16" forming the connector assembly 50". Threads 44 formed on the collar section 42 mate with threads 48 formed in the connector 16". The tuning tube 12 is pinched between the secondary fitting 38 and the connector 16" at junction 43 to further hold the tuning tube 12 in position. Again, if a hydraulic hose is to be connected to the connector 16", a nipple or other fitting can be formed with or attached to the connector 16".

Figure 7:
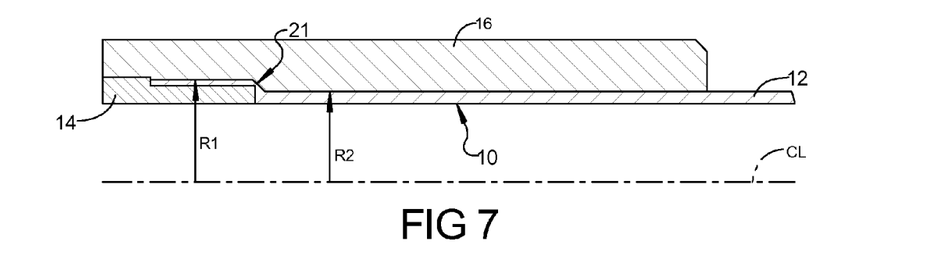
FIG. 7 is a partial cross-sectional view of the connector assembly shown in FIG. 4.

Now referring to FIG. 7 of the drawings, a partial cross-sectional view of the exemplary tuning tube retention assembly 10 is shown as held in the connector 16 by the secondary fitting 14 and by being pinched at the junction 21. The secondary fitting 14 is held in the connector 16 by a light press or it could be slipped into the connector 16 and held in place when the connector 16 is attached to another hydraulic system component such as another connector or pump, motor or valve block, etc. This is the same tube retention system shown in FIGS. 1 and 4. In both FIGS. 7 and 9, the bore of the connector 16 and 16" respectively is divided into sections having at least two inside radiuses R1 and R2 where the annular ledge formed at the interface between R1 and R2 is labeled as junction 21 and 43 respectively. At both junction 21 and 43, the tuning tube 12 is pinched when the secondary sleeve 14 and the threaded secondary sleeve 38 are fully inserted and secured in the connector 16 and 16" respectively to more firmly secure the tuning tube 12 within the connector 16, 16".

Figure 8:
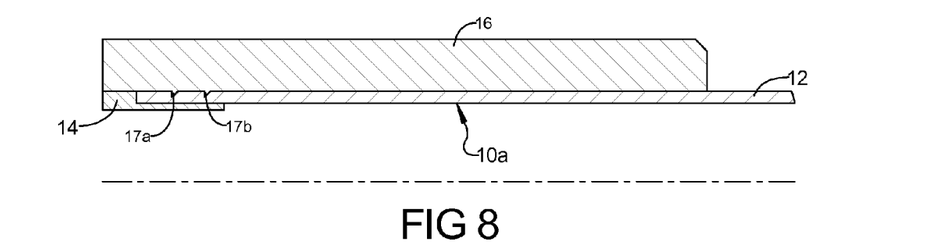
FIG. 8 is a partial cross-sectional view of an alternate embodiment of the inner cavity of the connector of the connector assembly shown in FIG. 1.

Now referring to FIG. 8 of the drawings, a partial cross-sectional view of the exemplary tuning tube retention assembly 10a is shown including the secondary fitting 14 as it is held in the connector 16a by a light press fit upon assembly. The tuning tube 12 is held on the sleeve section 18 of the secondary sleeve 14 by a press fit and also by at least one sleeve barb 17a, 17b. The sleeve barb(s) 17a, 17b can be segmented individual barbs or they can be one or more relatively sharp edged annular rings or ring barbs formed on the sleeve section 18 of the secondary fitting 14. Assembly of the tuning tube assembly 10a can follow the sequence of inserting the tuning tube 12 into the connector 16 at the outlet end to a desired position over the barbs 17a, 17b and then inserting the secondary fitting 14 into the inlet end of the connector 16 thereby further forcing the tuning tube 12 into the barbs 17a, 17b.

Figure 9:
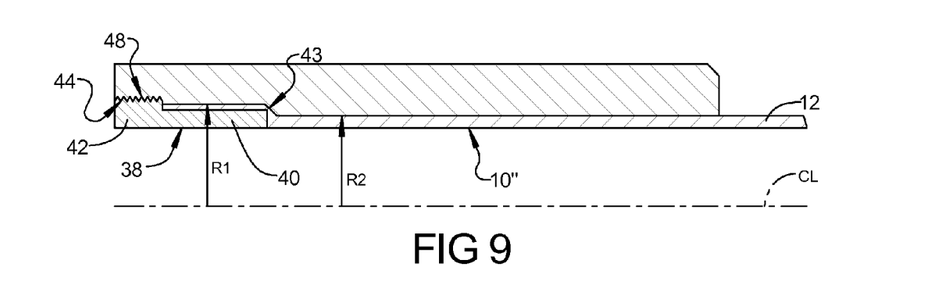
FIG. 9 is a partial cross-sectional view of the connector assembly shown in FIG. 6.

Now referring to FIG. 9 of the drawings, a partial cross-sectional view of the tuning cable assembly 10" is shown. The tuning tube 12 is clearly shown as being pinched at the junction 43 by the secondary fitting 38 and the connector 16". This is the same tube retention system shown in FIGS. 3 and 6. In both FIGS. 7 and 9, the bore of the connector 16 and 16" respectively is divided into sections having at least two inside radiuses R1 and R2 where the annular ledge formed at the interface between R1 and R2 is labeled as junction 21 and 43 respectively. At both junction 21 and 43, the tuning tube 12 is pinched when the secondary sleeve 14 and the threaded secondary sleeve 38 are fully inserted and secured in the connector 16 and 16" respectively to more firmly secure the tuning tube 12 within the connector 16, 16".

Figure 10:
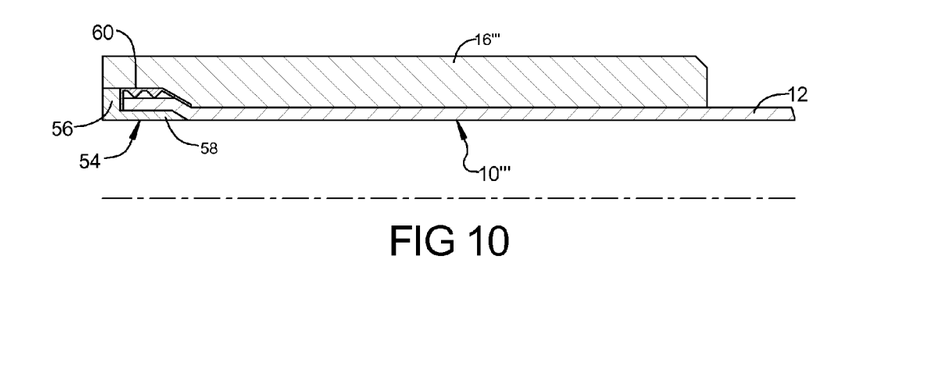
FIG. 10 is a partial cross-sectional view of a connector including an alternate embodiment of the secondary fitting.

Now referring to FIG. 10 of the drawings, a partial cross-sectional view of a fourth alternate configuration for securing a tuning cable 12 in a connector 16' is shown. The alternate secondary fitting 54 consists of a collar section 56 and both a sleeve section 58 and a barb section 60. The tuning cable 12 is trapped between the sleeve section 58 and the barb section 60. The collar section 56 is pressed into the receiving cavity 22 (see FIG. 1) of the connector 16. The tuning tube 12 is pinched between the sleeve section 58 and the barb section 60 and also is displaced toward the outside of the connector 16''' to hold the tube 12 in position. This is an alternative system of holding the tuning tube 12 in position as compared to other methods shown in the prior Figures.

Figure 11:
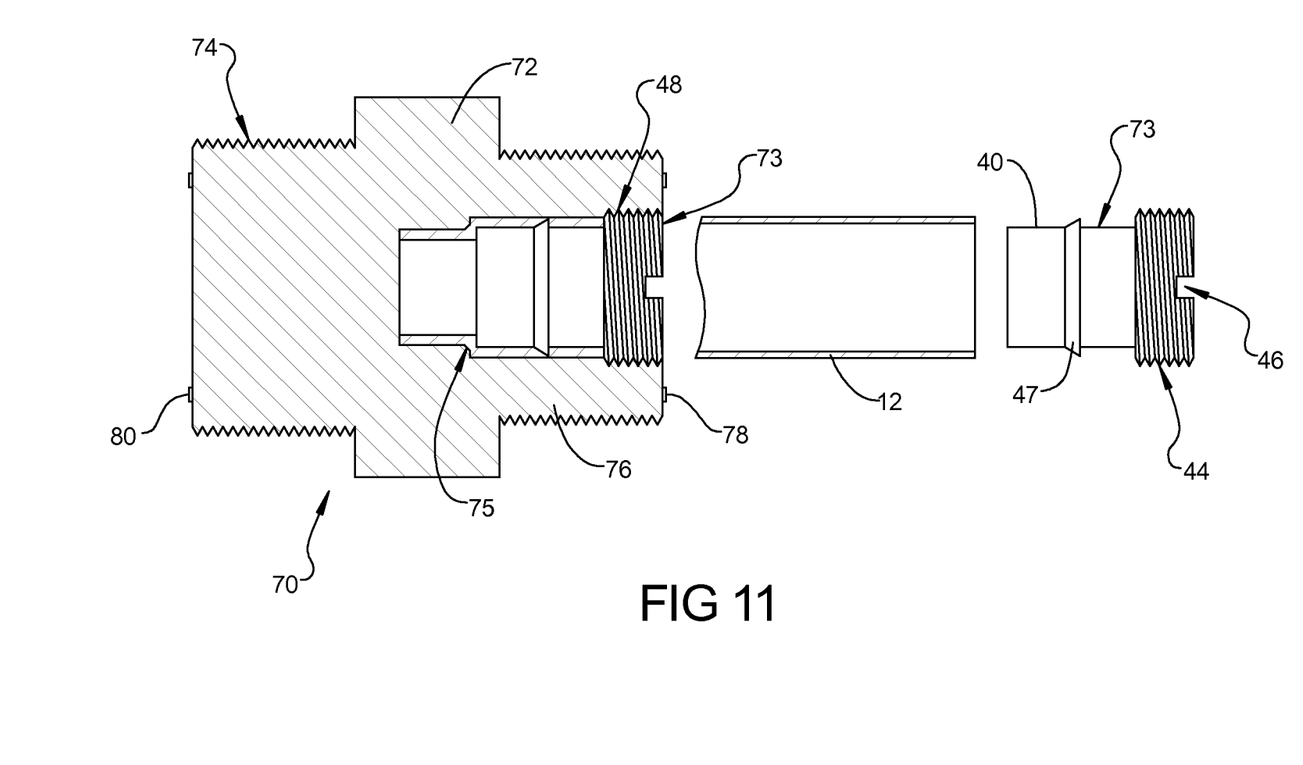
FIG. 11 is a partial cross-sectional view of the exemplary tuning cable retention assembly using a fitting.

Now referring to FIG. 11 of the drawings, a partial cross-sectional view of the exemplary tuning cable assembly 70 using a fitting 72 that is connected to a hydraulic system using threads 74 is shown. Also shown is an exploded view of a separate tuning cable 12 and the secondary threaded fitting 73. The secondary fitting 73 has a collar 42 with threads 44 formed on the collar 42 with threads 44 formed on the collar 42 that mate with threads 48 (see FIG. 3) formed in the inner bore 73 of the fitting 72. A barb 47 formed on the sleeve section 40 of the secondary fitting 73 is used to engage the inside wall of the tuning tube 12. To assemble the exemplary tuning tube assembly 70, the tuning tube 12 is pressed onto the sleeve section 40 and over the barb 47. The secondary fitting 73 and attached tuning tube 12 is slipped into the fitting 72. The secondary fitting 73 is rotated with a tool that engages the slot 46 to tighten the mating threads 44 and 48 and pinch the tuning tube 12 at junction 75. Annular seals 78 and 80 provide a sealed connection to other components of the hydraulic system. The threads 74 are used to attach the fitting to another hydraulic connector or fitting.

Figure 12:
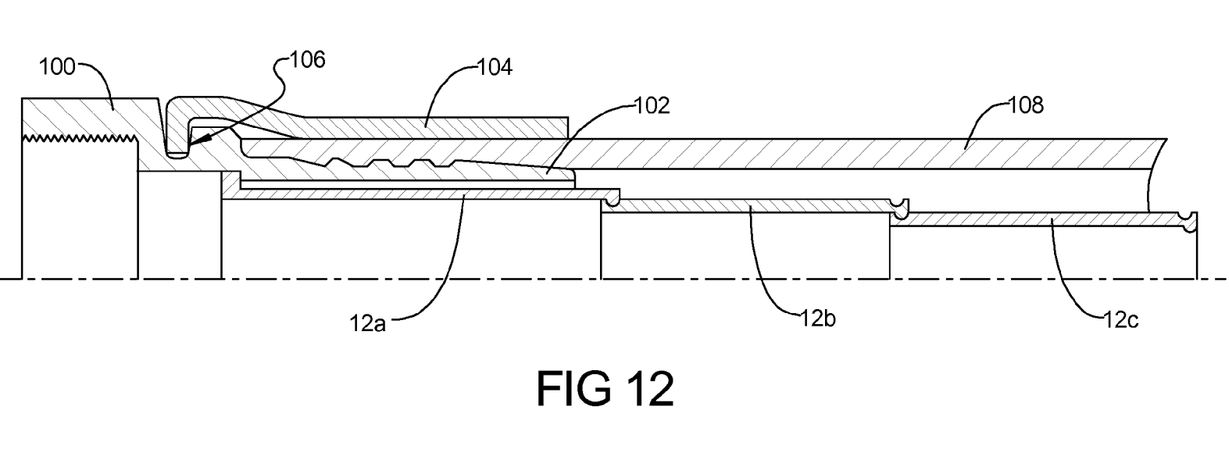
FIG. 12 is a partial cross-sectional view of the exemplary tuning cable retention assembly with an adjustable length tuning tube.

Now referring to FIG. 12 of the drawings, a partial cross-sectional view of an alternate embodiment of the tuning tube 12 is shown. The tuning tube 12 is shown as made up of three separate sections. A first tube section 12a which is mounted inside of the connector 100, a second tube section 12b which is attached to the first tube section 12a and a third tube section 12c which is attached to the second tube section 12b. Additional tube sections can be added in a similar fashion as needed for acoustic tuning of the tuning tube 12 or conversely, sections can be removed to shorten the tuning tube for tuning.

The connector 100 includes a barbed nipple section 102 and a hose socket 104 is mounted to a socket groove 106 formed in the connector 100. The hydraulic hose 108 is attached to the connector 100 by sliding the hose 108 over the nipple section 102 and then the hose socket 104 is crimped so as to squeeze the hose between the nipple section 102 and the socket 104. This retains the hose 108 on the connector 100 even when under relatively high hydraulic pressures.

The tuning tube 12 is retained to the connector 100 by any one of a number of methods usually involving a secondary sleeve such as those disclosed in this application. The length of the tuning tube 12 can be easily changed by adding or subtracting sections such as tube sections 12a, 12b and 12c. These tube sections 12a, 12b, 12c are held together by using an annular lip formed in one tube section such as 12a and a mating annular groove formed in an adjoining tube section such as 12b. This type of retention arrangement is continued for each additional tube section that is added to make up the full length of the tuning tube 12. The tuning tube 12 can be made of a variety of materials such as plastic or PTFE or fiberglass or metal of corrugated metal. Formed in the tuning tube can be a variety of apertures that are varied in number, shape and location in the tuning tube 12 depending on the tuning requirements of the particular hydraulic system.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. An apparatus for the reduction of fluid borne noise in a hydraulic system comprising:
    a hydraulic hose for conveyance of a hydraulic fluid under pressure;
    a connector attached to said hydraulic hose, said connector having a receiving cavity;
    a secondary fitting removeably mounted within said receiving cavity, said secondary fitting having a collar section and a sleeve section joined to said collar section; and
    a tuning tube attached to said sleeve section and extending within said hydraulic hose, wherein the tuning tube is in contact with an internal circumference of the connector over a length of the tuning tube within the connector.

2. The apparatus for the reduction of fluid borne noise in a hydraulic system of claim 1, wherein said secondary fitting is attached to said connector using threads.

3. The apparatus for the reduction of fluid borne noise in a hydraulic system of claim 1, wherein said secondary fitting is attached to said connector with a press interference fit between said secondary fitting and said connector.

4. The apparatus for the reduction of fluid borne noise in a hydraulic system of claim 1, wherein said secondary fitting includes a barb section formed on said sleeve section, said tuning tube disposed at least partially between said barb section and said connector.

5. The apparatus for the reduction of fluid borne noise in a hydraulic system of claim 3, further comprising a collet disposed between said sleeve section and said receiving cavity and pressing against said tuning tube.

6. An apparatus for reduction of fluid borne noise in a hydraulic system comprising:
    a connector for attachment to a hydraulic hose for the conveyance of a hydraulic fluid under pressure within the hydraulic system; and
    at least two tuning tube sections connected together at their ends and joined together to form a tuning tube, such that one of the tuning tube sections extends axially away from the other tuning tube section, each of the at least two tuning tube sections having outer diameters that are different from one another, said tuning tube attached to said connector.

7. An apparatus for reduction of fluid borne noise in a hydraulic system comprising:
    a connector for attachment to a hydraulic hose within the hydraulic system, said connector having a central cavity there through for the conveyance of a hydraulic fluid under pressure;
    a tuning tube secured to said connector and lying within said central cavity where said tuning tube is comprised of at least two separate first and second sections that are attached one end portion of the first section to one end portion of the second section and only partially overlap axially with one another, said at least two separate first and second sections having cylindrical shapes of approximately constant outer diameters.

8. The apparatus for reduction of fluid borne noise in a hydraulic system of claim 7, wherein said first and said second sections are attached on to the other using an annular ridge formed on said first section, where said annular ridge occupies an annular groove formed in said second section to hold said first and said second sections together to form said tuning tube.

9. A method of mounting a tuning tube to a connector comprising:
   providing a connector having a receiving cavity;
   providing a secondary fitting having a collar section adjacent to a sleeve section, said secondary fitting formed to fit substantially within said receiving cavity;
   engaging and securing a tuning tube to said sleeve section where said tuning tube and said secondary fitting are removeably held within said connector;
   modifying the tuning tube to tune the tuning tube and maximize noise attenuation in a subsequent installation of the tuning tube into the connector; and
   pinching between the tuning tube and the connector and at a junction therebetween to further secure the tuning tube in position.

10. The method of mounting a tuning tube of claim 9, wherein said secondary fitting is held within said connector using threads.

11. The method of mounting a tuning tube of claim 9, wherein said secondary fitting is held within said connector using an interference press fit between said collar section and said receiving cavity.

12. The method of mounting a tuning tube of claim 10, further comprising a collet disposed between said sleeve section and said receiving cavity and pressing against said tuning tube.

13. The method of mounting a tuning tube of claim 9, wherein said collar section includes a barb to retain said tuning tube on said sleeve section.

14. The apparatus for the reduction of fluid borne noise in a hydraulic system of claim 1, comprising a pinch at a junction between the tuning tube and the connector to further secure the tuning tube in position.

15. The apparatus for the reduction of fluid borne noise in a hydraulic system of claim 6, wherein an inner radial surface of one of the at least two tuning sections is connected to an outer radial surface of the other of the at least two tuning sections.

16. The apparatus for the reduction of fluid borne noise in a hydraulic system of claim 7, wherein an inner radial surface of the first section is attached to an outer radial surface of the second section.

* * * * *